United States Patent [19]

Daley et al.

[11] Patent Number: 4,461,755
[45] Date of Patent: Jul. 24, 1984

[54] PROCESS FOR PRODUCING HYDROGEN AND SULFUR FROM HYDROGEN SULFIDE

[75] Inventors: William D. Daley, Morristown; Robert D. Young, Whitehouse Station, both of N.J.

[73] Assignee: Allied Corporation, Morris Township, Morris County, N.J.

[21] Appl. No.: 513,554

[22] Filed: Jul. 14, 1983

[51] Int. Cl.$^3$ .................. C01B 3/04; C01B 17/04
[52] U.S. Cl. .................. 423/573 G; 423/220; 423/648 R
[58] Field of Search .............. 423/220, 224, 230, 231, 423/573 G, 573 R, 648 R, 571

[56] References Cited

U.S. PATENT DOCUMENTS 3,962,409  6/1976  Kotera et al. .................. 423/571
4,302,434  11/1981 Hellmer et al. ................. 423/573

FOREIGN PATENT DOCUMENTS 759375  5/1967  Canada ...................... 423/648 R
2233278  2/1975  France ...................... 423/573 G

OTHER PUBLICATIONS

M.E.D. Raymont, "Make Hydrogen from Hydrogen Sulfide", Hydrogen Processing, pp. 139-142 (1975).
E. Jorne et al., "High-Temp Methanation Tests Run", Oil & Gas Journal, vol. 78, Apr. 14, 1980, p. 120.

Primary Examiner—Earl C. Thomas
Assistant Examiner—Jeffrey E. Russel
Attorney, Agent, or Firm—Alan M. Doernberg; Gerhard H. Fuchs; Kenneth E. Stroup, Jr.

[57] ABSTRACT

A novel process for producing hydrogen and sulfur via the thermal decomposition of hydrogen sulfide is disclosed. The thermal decomposition of hydrogen sulfide is accomplished by passing a hydrogen sulfide containing gas through a reaction chamber containing a refractory material that has been preheated to a temperature between about 982° C. and about 1816° C. so that a gas stream comprising hydrogen, sulfur and hydrogen sulfide is produced. While one reaction chamber is used for decomposition, another is being preheated with hot gases such as a sulfur dioxide-oxygen mixture from a sulfur burner. When the peak temperature in the first reaction chamber declines to a selected value, the functions of the two reaction chambers are reversed.

19 Claims, 1 Drawing Figure

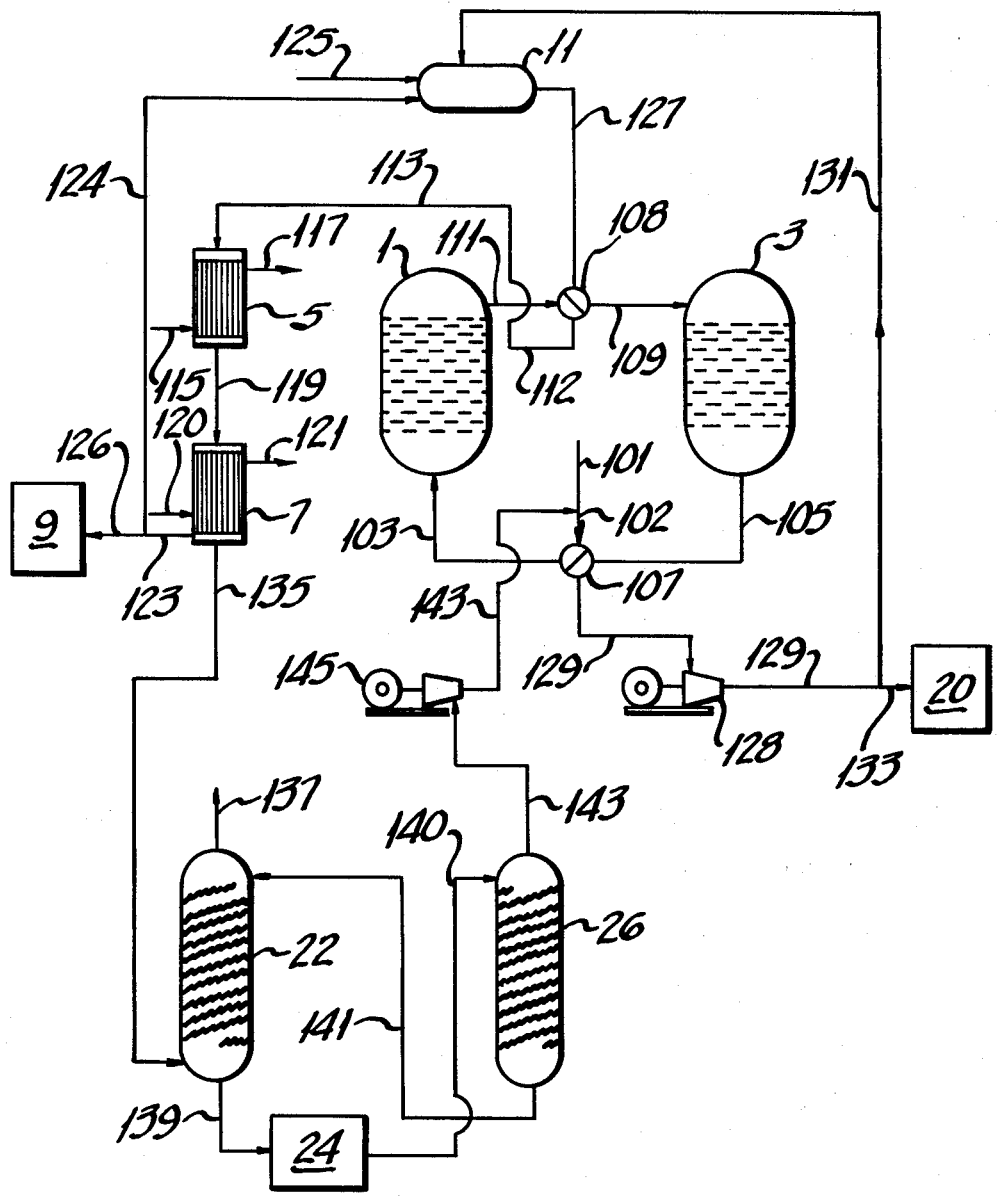

PROCESS FOR PRODUCING HYDROGEN AND SULFUR FROM HYDROGEN SULFIDE

DESCRIPTION

BACKGROUND OF THE INVENTION

This invention relates to a novel process for producing hydrogen and sulfur from hydrogen sulfide. More particularly, the process is a novel method for accomplishing the thermal decomposition of hydrogen sulfide at temperatures between about 982° C. and about 1816° C.

Hydrogen sulfide is found in various industrial streams. For example, hydrogen sulfide is produced during coal gasification and liquefaction, and hydrogen sulfide is produced in petroleum refining of sulfur bearing crudes. Hydrogen sulfide is also present in various proportions in sour natural gas which is found throughout the world.

The primary commercial method for processing hydrogen sulfide that is employed by industry is the well-known Claus process. The Claus process is an oxidation-reduction process which produces only sulfur and water.

It is known to the art that at elevated temperatures hydrogen sulfide is partially decomposed into hydrogen and sulfur as indicated by the following formula:

$$H_2S \rightarrow H_2 + \tfrac{1}{2}S_2$$

In recent years, the possibility of converting hydrogen sulfide into hydrogen and sulfur via thermal decomposition techniques has received much attention. In an article entitled "Make Hydrogen From Hydrogen Sulfide" (Hydrocarbon Processing 139-142, 1975), M.E.D. Raymont discusses the desirability of producing hydrogen and sulfur via thermal decomposition processes. Raymont discusses the possibility of employing various metal catalysts to drive the reaction so that moderate process conditions (i.e., lower temperatures) can be employed which will result in a sufficient conversion of hydrogen sulfide into hydrogen and sulfur. Additionally, Raymont describes two processes that employ the oxidation of carbon as the source of negative free energy change required to bring about the reaction.

U.S. Pat. No. 3,962,409 (Kotera et al., 1976) discloses a method for producing hydrogen and sulfur from hydrogen sulfide by contacting hydrogen sulfide with a catalyst selected from the group consisting of molybdenum sulfides, tungsten sulfides, and ruthenium sulfides at a temperature between about 450° C. and about 800° C.

U.S. Pat. No. 4,302,434 (Hellmer et al., 1981) discloses a method for thermally decomposing hydrogen sulfide into hydrogen and sulfur at temperatures between about 850° C. and about 1600° C. Hellmer et al. achieves the high temperatures necessary to effect the decomposition by either indirect heat exchange or more direct means by the combustion of a fuel in the decomposition chamber.

It is an object of the present invention to provide a commercially viable process for the thermal decomposition of hydrogen sulfide into hydrogen and sulfur. Our process does not require the aid of a catalyst. Our process achieves the decomposition of hydrogen sulfide by employing high temperatures in order to closely approach thermodynamic equilibrium. In the preferred embodiments of the invention, a portion of the sulfur that is produced by the process is combusted in the presence of an oxygen containing gas to produce hot gases that are employed to heat a decomposition reaction chamber to the required temperature profile.

BRIEF DESCRIPTION OF THE INVENTION

The present invention relates to a process for the production of hydrogen and sulfur from hydrogen sulfide where said process comprises:

a. Introducing a gas feed containing hydrogen sulfide into a first reaction chamber containing a refractory material preheated to a peak temperature between about 982° C. and about 1816° C. to produce a first vapor stream comprising hydrogen, sulfur and hydrogen sulfide, wherein heat is desorbed from said refractory material;

b. Heating a second reaction chamber containing a refractory material to a first peak temperature between about 982° C. and about 1816° C. simultaneously with step a by combusting an oxidizable material in an oxygen containing gas to produce hot gases that are introduced into said second reaction chamber to thereby heat said second reaction chamber, wherein heat is absorbed by said refractory material;

c. Cooling said first vapor stream to recover energy and condense elemental sulfur from said first vapor stream and to produce a second vapor stream comprising hydrogen and hydrogen sulfide;

d. Separating said second vapor stream into a hydrogen-containing stream and a stream comprising hydrogen sulfide; and e. Periodically alternating said heat desorbing step a and said heat absorbing step b between said first and said second reaction chambers, thereby subjecting said first and said second reaction chambers to periodically alternating heat absorbing and desorbing cycles; wherein said heat desorbing step a and said heat absorbing step b alternate between said first and said second reaction chambers when the first peak temperature in the reaction chamber undergoing heat desorption falls to a second peak temperature that is about 1° C. to about 300° C. below said first peak temperature.

BRIEF DESCRIPTION OF THE DRAWING

FIG. 1 is a schematic view of an embodiment of the process of the present invention.

DETAILED DESCRIPTION OF THE INVENTION

This invention relates to a novel process for producing hydrogen and sulfur from hydrogen sulfide. More particularly, the process involves decomposing hydrogen sulfide at high temperatures without the aid of a catalyst into hydrogen and elemental sulfur. The process is highly energy efficient and a very practical method for decomposing gaseous hydrogen sulfide into hydrogen and sulfur.

In accordance with this invention, a gas feed containing hydrogen sulfide is introduced into a first reaction chamber containing a refractory material having a first peak temperature between about 982° C. and about 1816° C. in order to produce a vapor stream comprising hydrogen, sulfur and hydrogen sulfide. During this step, heat is desorbed from said refractory material. Simultaneously with the introduction of the feed gas into the first reaction chamber, a second reaction chamber which is identical in design and material of construction to the first reaction chamber is heated to a first peak temperature between about 982° C. and about 1816° C. Heat is absorbed by the refractory material during the heating of this second reaction chamber. The preferred peak temperature for accomplishing the decomposition of hydrogen sulfide in many preferred embodiments of this invention is between about 1371° C. and about 1593° C.

Heating of the reaction chambers is accomplished by combusting an oxidizable fuel in an oxygen containing gas, thereby producing hot gases which are passed through the reaction chambers to heat the material and reaction chambers to the desired peak temperature and temperature profile. It should be appreciated that the described heating process results in the reaction chambers and refractory material having a temperature profile that has a peak temperature between about 982° C. and about 1816° C. in an upstream region of the reaction chambers. As used herein, an upstream region of the reaction chambers includes the interior region of the reaction chambers adjacent the point where said hot gases are introduced into the reaction chambers. The temperature of the refractory material and reaction chamber will be between about 38° C. and about 427° C. in the downstream region of the reaction chamber. As used herein, a downstream of the reaction chambers includes the interior region of the reaction chambers adjacent the point where said hot gases exit the reaction chambers. Thus, as the hydrogen sulfide containing gas feed travels through the reaction chamber, the gas feed is gradually heated to the peak temperature in order to accomplish the decomposition of hydrogen sulfide.

It will be appreciated that by employing a pair of reaction chambers in the manner described, the process of this invention employs a heat sink to provide the energy necessary for the decomposition of hydrogen sulfide into hydrogen and sulfur. More specifically, the hydrogen sulfide containing gas feed requires and will consume heat energy during the decomposition reaction that produces the vapor stream comprising hydrogen, sulfur and hydrogen sulfide. Consequently, and as described, heat will be desorbed from the refractory material, and the temperature profile in the reaction chamber performing the decomposition of hydrogen sulfide will gradually decline. Eventually, the temperature profile will reach a level where a sufficient conversion of hydrogen sulfide to hydrogen and sulfur will not occur. This will occur when the first peak temperature falls to a second peak temperature that is about 1° C. to about 300° C. below said first peak temperature. However, when this occurs, the second reaction chamber will have attained a peak temperature of about 982° C. to about 1816° C. along with a temperature profile that is capable of decomposing a sufficient amount of hydrogen sulfide, and the function of the reaction chambers may then be reversed. Upon reversing the function of the reaction chambers, the second reaction chamber will assume the decomposition function, and the first reaction chamber will be reheated to the decomposition temperature. Eventually, the peak temperature and the temperature profile in the second reaction chamber will decline to a level where a sufficient conversion of hydrogen sulfide into hydrogen and sulfur will not occur. The function of the reaction chambers may then be reversed again. Thus, in the continuous operation of the process of this invention, the reaction chambers will periodically alternate between heat desorbing and heat absorbing cycles whenever the first peak temperature in the reaction chamber performing the decomposition function falls to a second peak temperature that is about 1° C. to about 300° C. below said peak temperature.

The contact time of the feed gas in the packed section of the heated reaction chambers may range from about 0.4 to about 4.0 seconds and typically will be about 2.0 seconds. The reaction velocities at elevated temperatures, especially above 1800° F. (982° C.), are very rapid and the reactions clearly approach the temperature dependent equilibrium conversions in extremely short contact times. Hence, the contact time is not dictated by reaction velocities, but by the mass (or volume) of the reaction chamber packing required to accommodate the heat load of the process, consistent with a desired or acceptable switch time. Switch time is defined as the elapsed time between reversing the functions of the reaction chambers. The switch time is directly proportional to the product of the mass of the packing and its average specific heat. Switch times of 10 minutes or less up to 60 minutes or more are reasonable, but a switch time of about 30 minutes is generally preferred because this provides comfortable plant operation but avoids the added cost of unnecessarily large vessels. Using a high alumina packing, and sizing the reaction chambers for a 30 minute switch time, will result in an overall real contact time of about 2.0 seconds.

The preferred refractory materials for employment in the reaction chambers include high alumina, $Al_2O_3$, refractory balls having a bulk density between about 1200 $kg/m^3$ and about 2160 $kg/m^3$ and a specific heat between about 1.046 kJ/kg.K and about 1.297 kJ/kg.K. As used herein, high alumina is defined as 99.5 percent $Al_2O_3$ and containing trace amounts of $SiO_2$, $Fe_2O_3$ and $Na_2O$. It will be appreciated that the high alumina refractory materials will have some catalytic properties, especially at temperatures below about 982° C. However, the catalytic properties of said materials are much less important than the high bulk density and high specific heat properties of the materials. Other less preferred refractory materials that may be employed in the reaction chambers include, for example, an alumina material containing between about 5 percent to about 40 percent silica, $Si_2O_3$. These commercially available $Si_2O_3$ containing materials have lower bulk densities and specific heats and may be attacked by steam and/or hydrogen at elevated temperatures. It will also be appreciated that any refractory material that remains stable upon contact with hydrogen sulfide, hydrogen, steam, carbon monoxide, etc. at temperatures between about 982° C. and about 1816° C. may be employed in the process of this invention.

The vapor stream comprising hydrogen, sulfur and hydrogen sulfide produced during the described decomposition step will have an extremely high temperature. In order to recover energy and elemental sulfur, the vapor stream is passed through a suitable heat recovery system where the vapor stream is cooled to a temperature between about 121° C. and about 166° C., sulfur is condensed, energy is recovered in the form of steam, and a second vapor stream comprising hydrogen and hydrogen sulfide is produced. In the preferred embodiments of the invention, cooling of the vapor stream exiting the decomposition chamber is accomplished in two steps. Initially, the vapor stream is passed through a heat recovery apparatus such as a waste heat boiler where the vapor stream is cooled to a temperature between about 260° C. and about 427° C. and high pressure superheated steam of about 3447 kPa to about 6894 kPa is produced. Thereafter, the cooled vapor stream is passed to a sulfur condenser where the vapor stream is cooled to a temperature between about 121° C. and about 166° C., with elemental sulfur being condensed and collected and low pressure steam of about 207 kPa to about 689 kPa being produced. At this point, a second vapor stream comprising hydrogen, hydrogen sulfide and a small amount of non-condensed sulfur will exit the sulfur condenser.

The final primary step of the process involves separating hydrogen from the second vapor stream which comprises hydrogen, unconverted hydrogen sulfide and a small quantity of sulfur. This may be easily accomplished by absorbing hydrogen sulfide from the vapor stream by employing an amine system such as diethanolamine (commonly referred to as DEA). Amine and other absorption processes for separating gaseous mixtures comprising hydrogen and hydrogen sulfide are well known to those having skill in the art. The gaseous hydrogen product as well as the sulfur product may then be employed in various fashions. A discussion of some of the more attractive uses for the hydrogen and sulfur obtained by the process of this invention is discussed in more detail hereinbelow.

It is not absolutely necessary to recycle the hydrogen sulfide remaining after the hydrogen component is separated in order to be within the boundaries of this invention. However, in many preferred embodiments of the invention, the hydrogen sulfide-containing gas remaining after hydrogen is separated is introduced along with the non-processed hydrogen sulfide gas containing feed into said first or said second reaction chamber, wherein said hydrogen sulfide and said hydrogen sulfide gas containing feed are introduced into a reaction chamber undergoing heat desorption and which is performing the decomposition step. Recycling the remaining hydrogen sulfide renders the process more efficient in almost all cases.

The energy (i.e., heat) required for operation of the process of this invention is obtained by combusting an oxidizable fuel in an oxygen containing gas, thereby producing hot gases which are passed through the reaction chambers to heat the reaction chambers to the desired temperature level. A wide variety of fuels may be employed in the process of the invention. Illustrative examples of the more likely fuels include: (a) a portion (about 30% to about 100%) of the product sulfur that is recovered from the decomposition; (b) a portion (about 50% to 90%) of the product hydrogen that is recovered from the decomposition; (c) any hydrocarbon including methane, fuel oil, etc.; and (d) a portion of the hydrogen sulfide feed, either by itself or along with sulfur. If hydrogen sulfide were employed by itself, a considerable amount of water vapor would be formed and wound have to be accommodated in subsequent process steps. However, when employing hydrogen sulfide alone as the fuel, the size of the decomposition reaction chambers could be reduced by about 20% to about 40%.

Illustrative examples of oxygen containing gases in which the fuel may be combusted include high strength oxygen (i.e., 95% or higher), enriched air of any strength, or just air. It will be appreciated that the selection of a fuel and an oxygen containing gas will depend on the product(s) one desires to produce from the hydrogen and sulfur which in turn may depend somewhat on the source of the hydrogen sulfide.

There are numerous sources of hydrogen sulfide. Hydrogen sulfide streams are produced during coal gasification and liquefaction. Hydrogen sulfide is also produced during the refining of sour crude oil. Additionally, hydrogen sulfide is present in various proportions in sour natural gas which is found throughout the world.

As previously stated, the selection of a suitable fuel and oxygen containing gas depends on the product(s) one desires to obtain from the hydrogen and sulfur and may also depend on the source of the hydrogen sulfide. In order to more particularly explain this statement, some of the various product options that are available when sour natural gas is the source of hydrogen sulfide will be discussed.

Sour natural gas that contains hydrogen sulfide, of course, comprises a mixture of various hydrocarbons and will also likely contain various amounts of carbon dioxide. This gas may be purified by known processes such as an amine absorption process, a hollow fiber process (see U.S. Pat. No. 4,230,463), a membrane system, or by a process described in U.S. Pat. Nos. 3,533,732; 4,044,100; 3,594,985; 3,737,392; 3,362,133. These patents relate to a process known as Selexol ®, said patents being incorporated herein by reference.

Depending upon the gas separation system employed, some carbon dioxide and/or higher hydrocarbons may exit the sour gas cleaning step with the hydrogen sulfide. For example, a single absorber Selexol ® system will remove 90% of the carbon dioxide from the hydrogen sulfide as a separate stream. A two absorber Selexol ® system is capable of removing about 99% of the carbon dioxide from the hydrogen sulfide. However, the presence of carbon dioxide and/or other hydrocarbons in the hydrogen sulfide gas stream is not detrimental. In fact, the presence of these components will be desired in some cases. Our studies illustrate that essentially all of the carbon in the carbon containing compounds, such as $CO_2$ and various hydrocarbons (i.e. methane, ethane, propane, butane, isobutane, cyclopentane, pentane, hexane, higher alkanes, or any hydrocarbon that is present in a hydrogen sulfide containing gas stream irrespective of the origin of said stream), present in the hydrogen sulfide gas feed will be converted to carbon monoxide in the decomposition step and will exit the hydrogen separation step with the hydrogen as carbon monoxide. For example, carbon dioxide is reduced to carbon monoxide and the hydrocarbons are reformed to carbon monoxide and hydrogen.

It is known in the art that methane and methanol may be produced by reactions (1) and (2) as follows:

$$3H_2 + CO = CH_4 + H_2O \qquad (1)$$

$$2H_2 + CO = CH_3OH \qquad (2)$$

Therefore, by appropriately adjusting the hydrogen sulfide to carbon dioxide ratio, i.e. between about 5:1 and about 2:1, allowing for any hydrocarbons if present, a product stream that is suitable for the production of methanol or methane (i.e., synthetic natural gas) will be produced by the decomposition of hydrogen sulfide when the process of this invention is employed.

A gas feed containing hydrogen sulfide and carbon dioxide in a mole ratio of 4 moles hydrogen sulfide per mole of carbon dioxide will produce a product stream having a hydrogen to carbon monoxide ratio of 3 to 1. This product stream could be employed to produce synthetic natural gas (i.e., methane). A gas feed containing hydrogen sulfide and carbon dioxide in a mole ratio of 3 moles hydrogen sulfide per mole of CO$_2$ will produce a product stream having a hydrogen to carbon monoxide ratio of 2 to 1. This product stream could be employed to produce methanol. It will be appreciated, however, that the presence of carbon dioxide in excess of the described mole ratios or the presence of higher hydrocarbons in a gas feed containing the described mole ratios is not a serious problem. If carbon dioxide were present in excess of the described mole ratios or if hydrocarbons were present, the product stream exiting the hydrogen-hydrogen sulfide separation unit would simply contain more carbon monoxide than would be necessary for the production of methane or methanol. For example, if excess propane were present, carbon monoxide would be produced by the reaction of propane with water vapor in accordance with reaction (3) as follows:

$$C_3H_8 + 3H_2O \rightarrow 3CO + 7H_2 \tag{3}$$

The excess carbon monoxide may be removed by passing the product stream through a shift reaction unit where a given quantity of steam is added (if not already present) to the product stream. The steam will react with the excess carbon monoxide to produce carbon dioxide and hydrogen, and the carbon dioxide may be removed via conventional absorption procedures. Hydrogen would then be present in the mole ratio required for the production of methane or methanol. The reaction of steam with the excess carbon monoxide may be illustrated by reaction (4) as follows:

$$3CO + 3H_2O \rightarrow 3CO_2 + 3H_2 \tag{4}$$

A suitable method for the production of methane from hydrogen and carbon monoxide is described in a paper entitled "Conoco's Methanation Processes: Ready for Synfuels Industry." This paper was presented by B. J. Koch and M. H. Schwartz at the 3rd International Coal Utilization Conference and Exhibition, Houston, Texas, 1980. Another methanation process is described in an article by E. Jorn et al., "High-Temp. Methanation Tests Run," Oil and Gas Journal, Vol. 78, p. 120, 1980. These publications are incorporated herein by reference. Suitable modern methods for the production of methanol from carbon monoxide and hydrogen are described in SRI International Report No. 43B, George E. Haddeland, Menlo Park, Calif. (July 1981).

When employing the process of this invention to produce methane or methanol, any of the above-described fuels or oxygen containing gases are suitable. However, if one desired also to produce sulfuric acid, sulfur would be the fuel of choice and lower strength oxygen or air would be the oxygen containing gas of choice. The hot gases produced from combusting sulfur in the presence of lower strength oxygen, could upon exiting the decomposition reaction chamber, be used in the production of sulfuric acid. Alternatively, if one desired to produce sulfur trioxide and/or oleum, sulfur would be the fuel of choice and high strength oxygen would be the oxygen containing gas of choice. In this case, the sulfur dioxide gases produced, could upon exiting the chamber, be passed to a tube and shell converter in accordance with copending commonly assigned application Ser. No. 412,051 of Daley and Jaffe, filed Aug. 26, 1982, herein incorporated by reference, for the production of sulfur trioxide and/or oleum. Of course, when high strength oxygen is required, an air separation unit may be required unless it is otherwise available. Thus, when the hydrogen is employed to produce methane or methanol and high strength oxygen is needed for sulfur or oleum, a third product, nitrogen, will be produced. Another combination of products that may be produced in accordance with this invention is ammonia and sulfur trioxide and/or oleum. In this embodiment, the hydrogen sulfide would be purified as much as possible by removing as much of the carbon dioxide as is economically and technically feasible from the hydrogen sulfide so that the hydrogen product will contain only a small percentage of carbon monoxide. Carbon monoxide could be removed from the hydrogen product stream by employing shift reaction and carbon dioxide removal units as described hereinabove to thereby obtain essentially pure hydrogen gas. Thereafter, the hydrogen could be reacted with nitrogen from an air separation plant to produce ammonia. Sulfur would be burned as fuel in the presence of high strength oxygen from an air separation unit to produce hot sulfur dioxide gases which would heat the decomposition chamber and ultimately be converted to sulfur trioxide and/or oleum as described hereinabove.

It will be appreciated that the foregoing discussion of various combinations of desired products and the relation of the products to the choice of fuel and choice of oxygen-containing gas is illustrative only and that many other options are available.

It should be appreciated that in many cases, sulfur produced by the process of the invention will be the fuel of choice. The fundamentals of the process, when sulfur is employed as the fuel, are best explained by considering the following reactions and heats of reaction (on a gmol basis).

$$2H_2S \rightarrow 2H_2 + S_2, \quad H_R = 40.6 \text{ kcal} \tag{5}$$

$$S_2 + 2O_2 \rightarrow 2SO_2, \quad H_R = -172.9 \text{ kcal} \tag{6}$$

$$S_2 \rightarrow \tfrac{1}{4}S_8, \quad H_R = -24.2 \text{ kcal} \tag{7}$$

Reaction (5) shows that 40.6 kcal of energy are required to completely decompose 2 gmols of hydrogen sulfide, and reaction (6) shows that 172.9 kcal are evolved if the 1 gmol sulfur that was produced by the decomposition of hydrogen sulfide is oxidized to sulfur dioxide. Therefore, more than four times the energy required for the decomposition step is produced by the sulfur combustion.

A comparison of reactions (5) and (6) illustrates that a significant amount of excess energy is available when the product sulfur is employed as fuel for producing the energy necessary for the decomposition reaction. Part of the excess energy is required because the temperature of the hydrogen sulfide feed must be increased from about 38° C. or 93° C. to about 982° C.–1816° C. in the decomposition reaction chambers. However, nearly all of the excess energy is recovered as much needed steam. As previously described hereinabove, the sensible heat of the hot decomposed gas (i.e., first vapor stream) is recovered as high pressure steam in a suitable cooling apparatus such as a waste heat boiler, with low pressure steam being recovered in the sulfur condenser. Furthermore, additional heat is recovered from the first vapor stream as a result of the highly exothermic polymerization of S$_2$ to S$_8$ in acccordance with reaction (7).

This reaction initiates at the waste heat boiler and is complete at the sulfur condenser.

When one desires to produce sulfur trioxide from sulfur dioxide gases that may be employed to heat the reaction chambers, it should be appreciated that the further oxidation of sulfur dioxide to sulfur trioxide as per reaction (8) below will generate additional energy.

$$2SO_2 + O_2 \rightarrow 2SO_3, \ H_R = -46.9 \text{ kcal} \tag{8}$$

However, this energy will not be available for hydrogen sulfide decomposition since this step will be conducted externally to the decomposition reaction chambers. The energy from reaction (8) will, nevertheless, be captured as steam.

With reference to the FIGURE, continuous operation of the present invention will be described where the process is employed to produce hydrogen, sulfur and sulfuric acid from a gas feed containing essentially only hydrogen sulfide. The gas feed is introduced into gas feed line 101. Thereafter, the gas feed is combined with hydrogen sulfide recycle stream 143 in line 102. The combined gas feed passes through reversing valve 107 into gas feed line 103 through which the combined gas feed passes into reactor regenerator 1 which contains a refractory material as described herein which has been previously heated to a first peak temperature between about 982° C. and about 1816° C. in the upper zone of reaction regenerator 1. The temperature in the lower zone of reactor regenerator 1 will be about 38° C. to about 427° C. The temperature of the feed gas may range from about 10° C. to about 371° C. if a preheater is provided. Reactor regenerator 1 should preferably be operated near atmospheric pressure, but increased or decreased pressure may be employed if one desires to do so. It will be appreciated that increasing the pressure will decrease the conversion per pass. The gas feed travels through the reactor and is thus heated to the peak temperature in order to produce hot vapor comprising hydrogen sulfide, hydrogen and sulfur. If the peak temperature in reactor regenerator 1 is 1371° F., about 50 percent of the hydrogen sulfide will be decomposed into hydrogen and sulfur. A peak temperature of 1593° C. will result in decomposition of about 67 percent of the hydrogen sulfide, and a peak temperature of 1816° C. will result in decomposition of about 78 percent of the hydrogen sulfide. The vapor comprising hydrogen sulfide, hydrogen and sulfur exists reactor regenerator 1 into line 111. The vapor stream passes through line 111 into and through reversing valve 108 into line 113 (the first portion of which, line 112, is referred to in Example 2, below) through which it passes into waste heat boiler 5. Waste heat boiler 5 has boiler feed water admitted to it through line 115. In waste heat boiler 5, the hot vapor stream is cooled to a temperature between about 260° C. and about 427° C., thereby producing high pressure steam of about 3447 kPa to about 6894 kPa. This steam exits waste heat boiler via line 117 and may be employed as a source of energy in various fashions. The cooled vapor stream exits waste heat boiler 5 into line 119 through which it passes into sulfur condenser 7 where the vapor stream is cooled to a temperature between about 121° C. and about 166° C., sulfur is condensed, low pressure steam of about 138 kPa to about 483 kPa is produced, and a product stream comprising hydrogen, hydrogen sulfide and a small amount of non-condensed sulfur is produced. Sulfur condenser 7 has water admitted to it via line 120. The low pressure steam exits the sulfur condenser via line 121. This steam may also be employed as a source of energy in various fashions. Condensed sulfur passes from sulfur condenser 7 into line 123 where a portion of the sulfur is passed to sulfur collection unit 9 via line 126 and a portion passes into line 124. The sulfur in line 124 is passed through said line into combustion unit 11 where the sulfur is burned in the presence of an oxygen containing gas that is introduced into combustion unit 11 via line 125. Air may be employed in this case as the oxygen containing gas. Thus, hot vapor comprising primarily sulfur dioxide gases and nitrogen will exit combustion unit 11 into line 127. The exit temperature of this vapor after mixing with recycle stream 131 will range from about 982° C. to about 1816° C. The vapor stream comprising primarily sulfur dioxide gases and nitrogen passes through line 127 into and through reversing valve 108 into line 109 through which it is introduced into reactor regenerator 3 which is identical in design and material construction to reactor regenerator 1. The hot vapor passes through reactor regenerator 3 and heats the material in said reactor regenerator to a first peak temperature between about 982° C. and about 1816° C. in the upper zone of the reactor regenerator, with the temperature in the lower zone being between about 38° C. and about 427° C. Sulfur dioxide vapor exits reactor regenerator 3 into line 105 through which it passes into and through reversing valve 107 into line 129. The temperature of the sulfur dioxide vapor exiting reactor regenerator 3 will range from about 38° C. to about 427° C. Thereafter the sulfur dioxide vapor is passed through line 129 by means of recycle blower 128. A portion of the sulfur dioxide vapor having a temperature between about 38° C. and about 427° C. is passed into line 131 where it is recycled to combustion unit 11. The remainder of the sulfur dioxide containing vapor passes into line 133 through which it passes to sulfuric acid production unit 20 for the production of sulfuric acid.

The product stream comprising hydrogen, hydrogen sulfide and a small amount of sulfur exits sulfur condenser 7 into line 135 through which it is introduced into absorption column 22 where the hydrogen sulfide and sulfur are scrubbed from the product stream with an absorption liquid such as an aqueous solution of diethanolamine. Hydrogen gas exits absorption column 22 into line 137 through which it may pass to a collection unit or to another processing or production unit, as for example, an ammonia production unit. The absorption liquid containing hydrogen sulfide and sulfur exits absorption column 22 into line 139 through which it passes to sulfur filter unit 24 for removal of sulfur. Thereafter, the absorption liquid is introduced into desorption column 26 by means of line 140 where hydrogen sulfide is driven off by heat. The absorption liquid, now free of hydrogen sulfide, is then returned to absorption column 22 by means of line 141. The hydrogen sulfide liberated in desorption column 26 exits said column into line 143 where with the aid of recycle blower 145 said hydrogen sulfide is recycled into gas feed line 101 for processing in accordance with this invention.

It will be appreciated that the heating of reactor regenerator 3 is occurring simultaneously with the decomposition of hydrogen sulfide that is occurring in reactor regenerator 1. It will also be appreciated that the functions of reactor regenerator 1 and reactor regenerator 3 are periodically reversed by reversing the direction of flow through these vessels on a cyclical basis by means of reversing valves 107 and 108. The valves are synchronized so that they move together. This reversal will occur whenever the first peak temperature in a reactor regenerator performing the decomposition falls to a second peak temperature that is about 1° C. to about 500° C. below said first peak temperature. For example, when reactor regenerator 1 is performing the decomposition of hydrogen sulfide and reactor regenerator 3 is being heated to the desired temperature profile, upon reversal of functions, reactor regenerator 3 takes over the decomposition function of reactor regenerator 1, and reactor regenerator 1 will then be reheated to the desired temperature profile. In order to accomplish this, the functions of lines 109 and 111 are reversed by means of reversing valve 108, and the functions of lines 103 and 105 are reversed by reversing valve 107. Reversal of the functions of the reactor regenerators is necessary because a sufficient conversion of hydrogen sulfide will not occur when the first peak temperature in a reactor regenerator performing the decomposition step falls to a second peak temperature that is about 1° C. to about 500° C. below said first peak temperature. It will be appreciated that about one percent of the sulfur dioxide passing through reversing valve 108 may leak across said valve into stream 112, as illustrated in Example 2, below but this will not appreciably affect the process of this invention. Also, if desired, a heating means may be provided at some point in line 143 in order to heat the recycle stream to the temperature of the gas feed into the system.

It will also be appreciated that the process flow diagram illustrated by the FIGURE and described hereinabove may be used to illustrate the employment of the process of this invention for the production of methanol and sulfur trioxide. In this case, a sufficient amount of carbon dioxide and/or hydrocarbons will be present in the gas feed that is introduced into stream 101 so that stream 111 will include a hydrogen to carbon monoxide mole ratio of about 2:1 in addition to unconverted hydrogen sulfide and sulfur. The carbon monoxide will travel through the system (i.e. valve 108, streams 113, 119, 135, units 5 and 7) and will eventually exit absorber 22 into line 137 with hydrogen. Thereafter, the hydrogen-carbon monoxide stream may be passed to a suitable unit from the production of methanol. It will be appreciated that a shift reaction unit as described herein may be required if carbon monoxide is present in excess of the desired mole ratio.

Concurrently, when sulfur trioxide is a desired product, sulfur will be burned in the presence of oxygen to produce a hot gaseous mixture comprising sulfur dioxide and oxygen. This gaseous mixture will exit combustion unit 11 into line 127 and will pass through the system to heat the reactor-regenerators. The sulfur dioxide-oxygen gas mixture will exit the reactor-regenerators and will eventually be split into recycle stream 131 and stream 133. The gas mixture in stream 133 may then be passed to a suitable unit for the production of sulfur trioxide.

EXAMPLES

Extensive laboratory isothermal experiments were performed for the development of an overall kinetics model for the following components in the presence of high alumina packing (to some extent catalytic): $H_2S$, $H_2$, sulfur ($S_2$, $S_6$, and $S_8$), $H_2O$, $SO_2$, $CH_4$, $CO$, $CO_2$, $O_2$, $COS$, and $CS_2$. Contact times in these experiments ranged from 0.0176 to 6.0 seconds, and temperatures ranged from 204.4° C. to 926.7° C. A subset of these experiments, the non-carbon system, involved as reactants and products $H_2S$, $S_2$, $H_2$, sulfur, $SO_2$, and $H_2O$. The contact times and temperature ranges of these 45 experiments were the same as above. Eleven of these experiments were devoted to the $H_2S$, $H_2$, sulfur system. Here, contact times ranged from 0.5 to 4.0 seconds, and reaction temperatures ranged from 482.2° C. to 648.9° C.

For kinetics fitting purposes, the $H_2S$ decomposition reaction was written as $$\tfrac{1}{2}S_2 + H_2 = H_2S \tag{9}$$

The following kinetics model was fitted to the data:

$$\frac{d[H_2S]}{dt} = k_9 [p_{S_2}]^{\frac{1}{2}} [p_{H_2}] - \frac{k_9}{EK_9} [p_{H_2S}]$$

where:
- $k_9$ = the forward velocity constant
- $EK_9$ = the temperature dependent equilibrium constant for reaction 9
- $t$ = reaction time in seconds
- $[H_2S]$ = the mols of $H_2S$ per 100 mols initial feed.
- $p_{H_2S}$, $p_{S_2}$, $p_{S_2}$ = the partial pressure of the indicated component in atmospheres.

The forward velocity constant was fitted to the Arrhenius equation as follows:

$$\ln k_9 = 213.9 - \frac{13797.6}{T}$$

where T is in °K.

The equilibrium constant $EK_9$ was determined from readily available theremodynamic data (free energies of formation) and well known formulas. The reverse velocity constant is $k_9$ divided by $EK_9$.

This empirical kinetics model gave an excellent fit to the data and its form assures that given sufficient reaction time it will predict true equilibrium. These constants are tabulated below for various temperatures:

| Temp. °C. | $k_9$ | $k_9/Ek_9$ | $EK_9$ |
|---|---|---|---|
| 260 | $1.123 \times 10^{-2}$ | $6.167 \times 10^{-9}$ | $1.822 \times 10^6$ |
| 537.8 | $7.95 \times 10^1$ | $4.141 \times 10^{-2}$ | $1.920 \times 10^3$ |
| 815.6 | $6.105 \times 10^3$ | $9.624 \times 10^1$ | $6.343 \times 10^1$ |
| 1093.3 | $8.026 \times 10^4$ | $9.722 \times 10^3$ | 8.255 |
| 1371.1 | $4.419 \times 10^5$ | $2.069 \times 10^5$ | 2.136 |

The results of isothermally integrating the kinetics model for reaction 9 to equilibrium conditions are given in the following tabulation at both moderate and elevated temperatures. The feed is pure $H_2S$ in all cases. The contact times are the elapsed times required to reach equilibrium.

| Temp. °C. | Equilibrium Moles per 100 Moles Feed | | | Contact Time (sec.) |
|---|---|---|---|---|
| | $H_2S$ | $H_2$ | $S_2$ | |
| 648.9 | 97.75 | 2.25 | 1.13 | 4.100 |
| 926.7 | 86.62 | 13.38 | 6.69 | 0.100 |
| 1148.9 | 69.30 | 30.70 | 15.35 | 0.005 |
| 1371.1 | 49.48 | 50.52 | 25.26 | 0.001 |

Both of the above tabulations illustrate that the decomposition of $H_2S$ proceeds further and drastically more rapidly at elevated temperatures of 1093.3° C. to 1426.7° C. The contact time in the elevated temperature range zone of a reactor regenerator will be about 0.2 seconds, or as much as 200 times the time required to reach chemical equilibrium.

Consequently, chemical equilibria calculations based on widely available thermodynamic data, coupled with heat and material balance calculations, were used to determine the data in the examples.

EXAMPLE I

The operating conditions for selected numbered streams of FIG. 1 in terms of (kg mol)/hour are shown in Table I for processing in accordance with this invention of a gas feed that comprises 100% hydrogen sulfide. These data were determined by the above-described chemical equilibria calculations.

TABLE I

| | Stream Number | | | | | | | | | | | | | |
|---|---|---|---|---|---|---|---|---|---|---|---|---|---|
| | 101 | 143 | 103 | 113 | 119 | 123 | 135 | 137 | 124 | 125 | 127 | 105 | 131 | 133 |
| | Pressure (kPa) | | | | | | | | | | | | | |
| | 138 | 138 | 138 | 138 | 138 | 138 | 138 | 138 | 138 | 138 | 138 | 138 | 138 | 138 |
| | Temp. (°C.) | | | | | | | | | | | | | |
| | 65.55 | 65.55 | 65.55 | 1371 | 293.3 | 148.8 | 148.8 | 65.55 | 148.8 | 21.11 | 1371 | 65.55 | 65.55 | 65.55 |
| | kg mol | | | | | | | | | | | | | |
| $H_2$ | | | | 3336 | 3336 | trace | 3336 | 3336 | | | | | | |
| $O_2$ | | | | | | | | | | 4115 | 5098 | 5064 | 3331 | 1733 |
| $H_2S$ | 3338 | 3668 | 7007 | 3670 | 3670 | 1.625 | 3668 | | | | | | | |
| $SO_2$ | | | | | | | | | | | 6762 | 6693 | 4402 | 2291 |
| $SO_3$ | | | | | | | | | | | 107.1 | 174.7 | 114.9 | 59.78 |
| $S_2$ | | | | 1668 | 1.117 | trace | trace | | | | trace | | | |
| $S_6$ | | | | trace | 153.2 | trace | 0.236 | | | | trace | | | |
| $S_8$ | | | | trace | 301.9 | 415.7 | 1.183 | | 294 | | trace | | | |
| Total | 3338 | 3668 | 7007 | 8675 | 7463 | 417 | 7007 | 3336 | 294 | 4115 | 11967 | 11932 | 7848 | 4084 |

EXAMPLE II

The operating conditions for selected streams of FIG. 1 in terms of (kg mol)/hour are shown in Table II wherein the process of this invention is employed to produce a gas stream comprising hydrogen and carbon monoxide that may be employed to produce methanol. These data were determined as in Example 1.

We claim:

1. A continuous process for the production of hydrogen and sulfur from hydrogen sulfide wherein said process comprises:
   a. introducing a gas feed containing hydrogen sulfide into a first reaction chamber containing a refractory material preheated to a first peak temperature between about 982° C. and about 1816° C. to produce a first vapor stream comprising hydrogen, sulfur and hydrogen sulfide, wherein heat is desorbed from said refractory material;
   b. heating a second reaction chamber containing a refractory material to a first peak temperature between about 982° C. and about 1816° C. simultaneously with step a by combusting an oxidizable material in an oxygen containing gas to produce hot gases that are introduced into said second reaction chamber to thereby heat said second reaction chamber, wherein heat is absorbed by said refractory material;
   c. cooling said first vapor stream to recover energy and condense elemental sulfur from said first vapor stream and to produce a second vapor stream comprising hydrogen and hydrogen sulfide;
   d. separating said second vapor stream into a hydrogen-containing stream and a stream comprising hydrogen sulfide; and

TABLE II

| | Stream Number | | | | | | | | | | | | | | | |
|---|---|---|---|---|---|---|---|---|---|---|---|---|---|---|---|---|
| | 101 | 143 | 103 | D11 | 112 | 113 | 119 | 123 | 135 | 137 | 124 | 125 | 127 | 109 | 105 | 131 | 133 |
| | Pressure (kPa) | | | | | | | | | | | | | | | |
| | 138 | 138 | 138 | 124 | 124 | 124 | 117 | 117 | 117 | 689 | 165 | 165 | 159 | 159 | 145 | 145 | 145 |
| | Temp. (°C.) | | | | | | | | | | | | | | | |
| | 65.55 | 65.55 | 65.55 | 1427 | 1427 | 1432 | 361.1 | 148.8 | 148.8 | 43.33 | 148.9 | 21.11 | 1427 | 1427 | 65.55 | 65.55 | 65.55 |
| | kg mol | | | | | | | | | | | | | | | |
| $H_2O$ | 92.62 | 23.76 | 112.6 | 413.6 | 413.6 | 428.6 | 428.6 | 6.81 | 421.8 | 8.172 | 4.994 | | | | | | |
| $H_2$ | | | | 584.3 | 584.3 | 580.7 | 580.7 | | 580.7 | 580.7 | | | | | | | |
| $N_2$ | | | | | 33.6 | 33.6 | 33.6 | | 33.6 | 33.6 | | | 2847 | 3346 | 3313 | 3313 | 499.4 | 2814 |
| $O_2$ | | | | | 0.908 | | | | | | | | 757 | 87.62 | 86.71 | 86.26 | 13.17 | 73.55 |
| $H_2S$ | 898.0 | 477.2 | 1375 | 489.9 | 489.9 | 478.5 | 478.5 | | 478.5 | | | | | | | | |
| $SO_2$ | | 36.77 | 4.086 | 4.086 | 11.81 | 4.54 | 4.54 | | 4.54 | | | | 798.1 | 790.4 | 789.5 | 118.9 | 670.6 |
| $SO_3$ | | | | | | | | | | | | | 2.27 | 2.27 | 3.178 | 0.454 | 2.724 |
| $S_2$ | | | | 442.2 | 442.2 | 451.7 | 3.178 | | | | | | | | | | |
| $S_6$ | | | | | | | 70.37 | | | | | | | | | | |
| $S_8$ | | | | | | | 59.47 | 112.6 | 0.454 | | 80.36 | | | | | | |
| CO | | | | 300.1 | 300.1 | 298.3 | 298.3 | | 298.3 | 298.3 | | | | | | | |
| $CO_2$ | 299.2 | 61.29 | 360.5 | 59.93 | 59.93 | 61.74 | 61.74 | | 61.74 | | | | | | | | |
| COS | | 8.172 | 8.172 | 8.626 | 8.626 | 8.626 | 8.626 | | 8.626 | | | | | | | | |
| $CS_2$ | | | | 0.454 | 0.454 | 0.454 | 0.454 | | 0.454 | | | | | | | | |
| Total | 1290 | 570.7 | 1861 | 2303 | 2345 | 2346 | 2028 | 119.4 | 1888 | 920.7 | 85.35 | 3604 | 4235 | 4193 | 4192 | 632 | 3561 |

Stream 112 represents stream 111 plus leakage of a small amount of $N_2$, $O_2$ and $SO_2$ across valve 108 from stream 127. Stream 113 represents stream 112 after the reaction (and slight temperature rise because of heat of reaction) of the combined gas mixture.

hydrogen sulfide; and e. periodically alternating said heat desorbing step a and said heat absorbing step b between said first and said second reaction chambers, thereby subjecting said first and said second reaction chambers to periodically alternating heat absorbing and desorbing cycles; wherein said heat desorbing step a and said heat absorbing step b alternate between said first and said second reaction chambers when the first peak temperature in the reaction chamber undergoing heat desorption declines to a second peak temperature that is about 1° C. to about 300° C. below said first peak temperature.

2. A process in accordance with claim 1 wherein said process includes recycling into said first or said second reaction chamber hydrogen sulfide from said stream of step d comprising hydrogen sulfide as part of the gas feed into the reaction chamber undergoing heat desorption.

3. A process in accordance with claim 1 wherein said cooling of said first vapor stream comprises initially cooling said first vapor stream to a temperature between about 260° C. and about 427° C. to produce high pressure steam of about 3447 kPa to about 6894 kPa, and then cooling said first vapor stream to a temperature between about 121° C. and about 166° C. to produce low pressure steam of about 138 kPa to about 483 kPa and to condense elemental sulfur, and said second vapor stream comprising hydrogen and hydrogen sulfide.

4. A process in accordance with claim 1 wherein said refractory material is high alumina having a bulk density between about 1200 kg/m$^3$ and about 2160 kg/m$^3$ and a specific heat between about 1.046 kJ/kg.K and about 1.297 kJ/kg.K.

5. A process in accordance with claim 1 wherein said first peak temperature is between about 1371° C. and about 1593° C.

6. A process in accordance with claim 1 wherein at least a portion of said elemental sulfur of step c of claim 1 is employed as said oxidizible material.

7. A process in accordance with claim 6 wherein at least about 40 percent of said elemental sulfur is employed as said oxidizable material.

8. A process according to claim 6 wherein said oxygen containing gas is air.

9. A process according to claim 6 wherein said oxygen containing gas comprises at least about 95 percent oxygen.

10. A process in accordance with claim 1 wherein said hydrogen of said hydrogen containing stream is employed as said oxidizable material.

11. A process in accordance with claim 10 wherein at least about 50 percent of said hydrogen is employed as said oxidizable material.

12. A process according to claim 1 wherein said gas feed comprises hydrogen sulfide and carbon dioxide and wherein said first and second vapor streams additionally include carbon monoxide.

13. A process according to claim 12 wherein the mole ratio of hydrogen sulfide to carbon dioxide in said gas feed is between about 5:1 and about 2:1.

14. A process according to claim 13 wherein said mole ratio is about 4:1.

15. A process according to claim 14 wherein said second vapor stream comprises hydrogen and carbon monoxide in a mole ratio of about three moles of hydrogen per mole of carbon monoxide.

16. A process according to claim 13 wherein said mole ratio is about 3:1.

17. A process according to claim 14 wherein said second vapor stream comprises hydrogen and carbon monoxide in a mole ratio of about two moles of hydrogen per mole of carbon monoxide.

18. A process according to claim 12 wherein said gas feed additionally includes one or more hydrocarbons.

19. A process according to claim 1 wherein said gas feed includes one or more hydrocarbons.

* * * * *